(12) United States Patent
Drobe

(10) Patent No.: US 8,079,705 B2
(45) Date of Patent: Dec. 20, 2011

(54) PRODUCTION OF AN OPHTHALMIC ELEMENT ADAPTED FOR FOVEAL AND PERIPHERAL VISION

(75) Inventor: Bjorn Drobe, Charenton le Pont (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 148 days.

(21) Appl. No.: 12/526,112

(22) PCT Filed: Feb. 12, 2008

(86) PCT No.: PCT/FR2008/050210
§ 371 (c)(1),
(2), (4) Date: Sep. 23, 2009

(87) PCT Pub. No.: WO2008/104695
PCT Pub. Date: Sep. 4, 2008

(65) Prior Publication Data
US 2010/0002191 A1    Jan. 7, 2010

(30) Foreign Application Priority Data
Feb. 15, 2007   (FR) ..................... 07 01110

(51) Int. Cl.
*G02C 7/02*   (2006.01)
(52) U.S. Cl. ...................... 351/177
(58) Field of Classification Search .............. 351/177
See application file for complete search history.

(56) References Cited

U.S. PATENT DOCUMENTS

| 7,029,116 | B2 | | 4/2006 | Roscini |
| 7,434,935 | B2 | * | 10/2008 | Bonnin .......................... 351/246 |
| 7,806,526 | B2 | * | 10/2010 | Bourdoncle et al. .......... 351/169 |
| 2003/0107707 | A1 | * | 6/2003 | Fisher et al. ................... 351/177 |
| 2005/0088616 | A1 | * | 4/2005 | Nason et al. ................... 351/177 |
| 2005/0105047 | A1 | | 5/2005 | Smitth, III et al. |
| 2005/0226347 | A1 | | 10/2005 | Cerisier et al. |
| 2007/0103641 | A1 | | 5/2007 | Bonnin |
| 2008/0252846 | A1 | * | 10/2008 | Biver et al. .................... 351/163 |
| 2009/0257026 | A1 | * | 10/2009 | Varnas et al. .................. 351/209 |

FOREIGN PATENT DOCUMENTS

| EP | 1262815 | 12/2002 |
| WO | WO2005/055891 | 6/2005 |
| WO | WO 2007/036626 | * 4/2007 |

OTHER PUBLICATIONS

Williams et al., "Off-Axis Optical Quality and Retinal Sampling in the Human Eye." *Vision Res.*, vol. 36, No. 8, pp. 1103-1114 (1996).

(Continued)

*Primary Examiner* — Jordan Schwartz
(74) *Attorney, Agent, or Firm* — Occhiuti Rohlicek & Tsao LLP

(57) ABSTRACT

The invention relates to a method for making an ophthalmic member for correcting ametropia, that is adapted for correcting the central and peripheral vision of a wearer and takes into account the amplitudes of the movements of the wearer's eyes and head. A central area of the member, in which the central vision is corrected, is sized based on the amplitude of the eyes' movements in order to provide good visual comfort. The peripheral vision is corrected in a peripheral area of the ophthalmic member in order to prevent an increase of the wearer's ametropia in the long run.

12 Claims, 5 Drawing Sheets

OTHER PUBLICATIONS

Navarro et al., "Monochromic Aberrations and Point-Spread Functions of the Human Eye Across the Visual Field." *J. Opt. Soc. Am. A*, vol. 15, No. 9, pp. 2522-2529 (1998).

Devie et al., "Varilux® Ipseo™ Eye/Head Strategy and Physiological Personalisation." *Points de Vue-International Ocular Optics Information Magazine from Essilor*, pp. 23-27 (2003).

Rempt et al., "Influence of Correction of Peripheral Refractive Errors on Peripheral Static Vision." *Opthalmologica, Basel 173*, pp. 128-135 (1976).

Smith III et al., "Peripheral Vision can Influence Eye Growth and Refractive Development in Infant Monkeys." *Investigative Ophthalmology & Visual Science* vol. 46, No. 11, pp. 3965-3972 (2005).

Mutti et al., "Peripheral Refraction and Ocular Shape in Children." *Investigative Ophthalmology & Visual Science* vol. 41, No. 5, pp. 1022-1030 (2000).

\* cited by examiner

PRODUCTION OF AN OPHTHALMIC ELEMENT ADAPTED FOR FOVEAL AND PERIPHERAL VISION

CROSS-REFERENCE TO RELATED APPLICATIONS

This application is the National Stage of International Application No. PCT/FR2008/050210, filed on Feb. 12, 2008, which claims the priority of French Application No. 0701110, filed on Feb. 15, 2007. The contents of both applications are hereby incorporated by reference in their entirety.

BACKGROUND

The present invention relates to a method for the production of an ophthalmic element for correcting ametropia, which is adapted for correcting the foveal and peripheral vision.

In order to correct a subject's ametropia, a spectacles lens is used, which is placed in front of the eye in a fixed fashion in relation to the face, using a frame for holding the lens. The central zone of the lens then serves mainly to correct the wearer's ametropia when the latter looks straight in front. The image of an object viewed under these conditions is detected by a central zone of the wearer's retina, called the foveal zone. For this reason, the visual perception that corresponds to the direction of viewing straight in front is called foveal vision, or central vision. A purpose of the ametropia correction produced by the central zone of the spectacles lens therefore consists of bringing the image of an object which is positioned in front of the spectacle wearer back into the plane tangential to the retina in the foveal zone. Such a correction is only approximate for certain viewing conditions, in particular because the exact position of the image varies along the optical axis of the eye as a function of the viewing distance of the object.

The peripheral zone of the lens, located around the central zone of the latter, also participates in the formation of the image on the retina when the observer looks straight in front, without turning the eyes, for parts of the object that are off-axis. The parts of the image corresponding to the off-axis parts of the object are then located outside the foveal zone, in the peripheral zone of the retina. For this reason, the corresponding visual perception is called peripheral vision.

The defect in the position of the image on the retina when the wearer looks straight in front can vary between foveal vision and peripheral vision. This variation depends on the shape of the wearer's eye and the retinal angular offset. It varies, in general, for different wearers. For this reason, a foveal-vision ametropia and a peripheral-vision ametropia for a given angular offset are distinguished for each wearer, with two corresponding ametropia corrections.

Now, it is known that for a myopic wearer, formation of the image behind the retina leads to an elongation of the eye. Such defocusing thus causes an increase in the degree of myopia of the wearer. This effect is produced not only when the image is formed behind the retina in the foveal zone, i.e. in foveal vision, but also when it is formed behind the retina in the peripheral zone of the latter, i.e. in peripheral vision. In order to avoid such a worsening of the ametropia, it has been proposed to adapt the spectacles lens outside its central zone in order to correct the wearer's peripheral vision. The central zone of the lens thus produces the correction of the foveal vision, and the peripheral zone of the lens, located around the central zone, produces the correction of the peripheral vision.

Such an adaptation of a corrective ophthalmic lens is disclosed in the document US 2005/0105047.

But, when the lens wearer views an off-axis object by turning the eyes, the direction of his gaze passes through the lens at a point of the peripheral zone. The optical features of the lens at this point are then no longer suitable for forming an image on the retina along the direction of gaze, i.e. along the optical axis of the eye that is turned. Indeed, the ametropia involved under these conditions along the optical axis of the eye is ametropia of foveal vision, but the optical axis of the eye intersects the lens at a point where the vision correction produced corresponds to the peripheral vision. The ametropia correction produced is then not suited to these viewing conditions, and the wearer's visual comfort is reduced.

SUMMARY

An object of the present invention is therefore to provide a wearer with an ametropia correction that provides him with good visual comfort while limiting or removing long-term worsening of his ametropia.

To this end, the invention proposes a method for producing an ophthalmic element for correcting ametropia, capable of correcting the foveal vision and the peripheral vision of a wearer of this element, and comprising the following steps:

/1/ characterizing relative amplitudes of respective movements of the wearer's eyes and head;

/2/ determining ametropia corrections respectively for the foveal vision and the peripheral vision of the wearer;

/3/ determining an optical power distribution of the ophthalmic element along a face of the latter which produces the ametropia correction for the foveal vision in a central zone of the ophthalmic element, and which varies outside the central zone towards an optical power value corresponding to the ametropia correction for peripheral vision; and /4/ producing the ophthalmic element so as to obtain this optical power distribution.

According to the invention, the amplitude of the wearer's eye movements characterized in step /1/ is used in step /3/ to determine a size of the central zone of the ophthalmic element in which the correction of the foveal vision is produced. This size of the central zone for correction of foveal vision increases as a function of the amplitude of the wearer's eye movements.

Within the framework of the invention, by centre of the ophthalmic element is meant a central point of the face of the latter, corresponding to the intersection of this face with the direction of gaze of the wearer straight in front, for the position of use of the ophthalmic element. The optical power of the ophthalmic element at this central point is equal to the correction which is determined for the wearer's foveal vision. Moreover, the optical power may vary continuously along the face of the ophthalmic element. By central zone of the element, in which the correction of the foveal vision is produced, is meant a part of the element located around the point central of the latter, parallel to the face of the element, and in which the optical power has an absolute deviation with respect to the power value at the central point, which is less than a determined limit. This limit on the variations of the optical power within the central zone of the ophthalmic element may be equal to 0.10 or 0.25 diopter, for example.

Thus, the invention consists of taking into account a behavioural characteristic of the wearer in order to determine a compromise between correction of the foveal vision and that of the peripheral vision. This behavioural characteristic is the propensity of the wearer to rotate the head or the eyes more in order to view an object that is not positioned in front of him.

The invention thus consists of an additional personalization of the ophthalmic element, beyond the correction of the wearer's vision, in order to optimize the compromise between the ametropia corrections relating to the foveal vision and the peripheral vision.

For a wearer who prefers to move the eyes in order to view an off-axis object, the method of the invention provides a larger zone of the ophthalmic element that corrects the wearer's foveal vision. Thus, the image of an object viewed by the wearer is correctly formed on the retina, for a greater interval of the angle of rotation of the eyes.

Conversely, for a wearer who prefers to move the head, and thus who usually looks through the ophthalmic element in a restricted zone of the latter located around its centre, a larger peripheral zone is adapted for the peripheral vision.

Thus, a method according to the invention makes it possible to produce an optimal compromise between correction of the peripheral vision and that of the foveal vision, over the whole surface of the ophthalmic element. This compromise varies according to the wearer. In particular, the compromise obtained provides good foveal-vision comfort for a wearer who mainly moves the eyes, whilst providing him with a correction of his peripheral vision close to the edge of the ophthalmic element. At the same time, the method of the invention provides an increased correction of the peripheral vision for a wearer who mainly moves the head. Thus correction comfort and avoidance of worsening the wearer's ametropia are combined optimally for each wearer.

BRIEF DESCRIPTION OF THE DRAWINGS

Other features and advantages of the present invention will become apparent from the following description of non-limitative embodiments, with reference to the attached drawings in which.

DETAILED DESCRIPTION

The invention is now described in detail within the framework of realizing a corrective ophthalmic lens of the spectacles lens type. But it is understood that the invention can be applied to other ophthalmic elements that carry out an ametropia correction, such as lenses for winter-sports or diving goggles in particular.

Moreover, a spectacles lens capable of producing a myopia correction is taken by way of example. But it is also understood that the invention may be similarly applied to any corrective lens, whatever the nature of the wearer's ametropia.

Figure 1A:
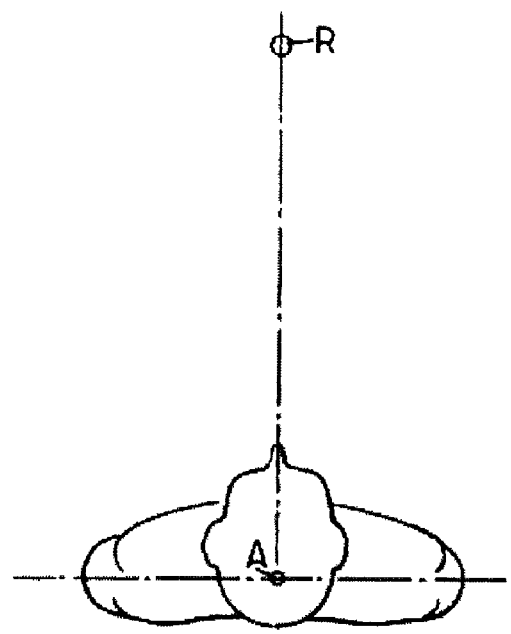
FIGS. 1a and 1b show a measurement principle for eye and head movements for a spectacle wearer.

Firstly, the relative amplitudes of eye and head movements are characterized for the future wearer for whom the lens is intended. To this end, the wearer is asked to look at a first target straight in front of him, called a reference target, positioning himself facing the latter. The reference target is denoted R in FIG. 1a. It is preferably positioned at the wearer's eye level. Thus the wearer positions himself in front of the reference target, with his shoulders positioned approximately in a vertical plane which is perpendicular to the virtual line between his head and the reference target. His head and eyes are then oriented towards the reference target.

Starting from this position, the wearer is then asked to look at a second target, called a test target and denoted T, offset with respect to the reference target, without moving the shoulders. In order to do this, he rotates the head partially and the eyes partially (FIG. 1b), so that the direction of his gaze passes from the reference target R to the test target T. Preferably, the test target is offset horizontally with respect to the reference target, in order to characterize the horizontal movements of the wearer's head and eyes.

Figure 1B:
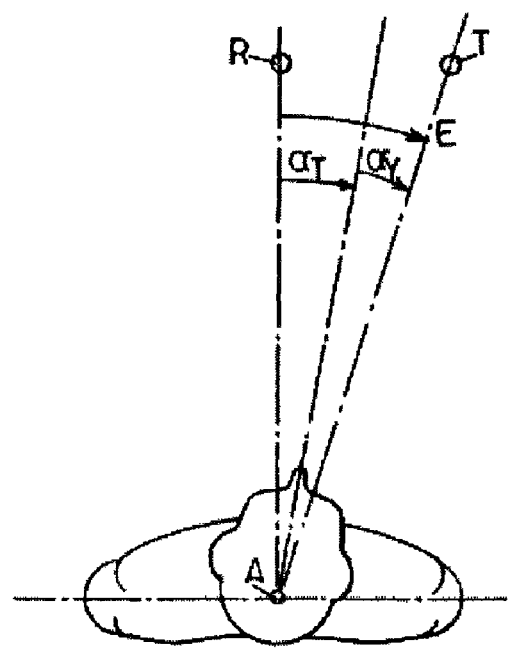

The angular displacement of the test target with respect to the reference target is called angular offset, and denoted E. The centre of the head A is taken as a measurement point for the angles in a horizontal plane containing this point and the two targets R and T. In FIG. 1b, $\alpha_T$ denotes the angle of rotation of the wearer's head, also called angular deviation of the head, in order to pass from the first position of viewing the reference target to the second position of viewing the test target. $\alpha_Y$ is the angle of rotation of the eyes performed at the same time by the wearer. The angular offset E is therefore equal to the sum of the two angles $\alpha_T$ and $\alpha_Y$.

The quotient of the angular deviation of the head $\alpha_T$ by the angular offset E is then calculated. This quotient is equal to unity for a wearer who exclusively turned the head to pass from the reference target to the test target, and zero for a wearer who only turned the eyes.

A gain G is then calculated for this "head/eye" movement coordination test which was carried out for the wearer. The gain G may be defined by a predetermined increasing function of the quotient of the angular deviation of the head $\alpha_T$ by the angular offset E. For example, the gain G may be directly equal to the quotient of $\alpha_T$ divided by E: $G=\alpha_T/E$. A wearer who essentially rotates the eyes to look at the test target thus has a value for gain G close to zero, and a wearer who essentially rotates the head to look at the same target has a value for G close to unity.

This "head/eye" movement coordination test may be carried out by the wearer in the shop at the retail optician where he orders his spectacles provided with corrective lenses.

By way of comparative examples for the remainder of this description, two wearers will be considered who require identical corrections of foveal vision, equal to −4.00 diopters. The first wearer has a gain value G equal to 0.1, indicating that he rotates the eyes more than the head in order to view an off-axis object, and the second wearer has a gain value G equal to 0.8, indicating that he rotates the head more that the eyes under the same conditions.

Generally, the ametropia correction suited to the peripheral vision may be determined for each wearer by performing a measurement on the latter. Such a measurement may be, in particular, an autorefraction or skiascopy measurement.

Alternatively, the ametropia correction for a wearer's peripheral vision and for a fixed angular offset may be determined by adding a constant value to the ametropia correction value which is determined for the foveal vision of this wearer. This constant value can be in particular, +0.8 diopter, corresponding to a mean deviation between a subject's degree of foveal-vision myopia and his degree of peripheral-vision myopia, for an angular offset of 30°.

A size of a central zone of the lens in which the ametropia correction is produced for the foveal vision may then be determined as a function of the gain G which is calculated for each wearer. Generally, the central zone of the lens in which the ametropia correction for the foveal vision is produced may have any shape whatever. In particular, its vertical diameter, with respect to the position of use of the lens by the wearer, may be smaller than its horizontal diameter. Indeed, the vertical movements of the head in general have amplitudes smaller than those of the horizontal movements of the head, in relation to corresponding ocular movements.

This size of the central zone of the lens, in which the correction of foveal vision is produced, may be determined via a value for the optical power of the lens that is produced at a point of the lens located outside the central zone of the latter. This point corresponds to a reference angular offset. Given that the optical power varies continuously, starting from the correction value that is produced at the optical centre of the lens, a greater deviation between the value for the optical power which is determined for the reference angular offset and that produced at the centre of the lens corresponds to a smaller size of the central zone of the lens, in which the correction is suited to the wearer's foveal vision. The optical power value determined for the point of the lens located outside the central zone itself depends on the gain calculated for each wearer.

According to a first embodiment of the invention, the optical power of the lens evaluated for the reference angular offset, denoted PX, may be determined using a predefined first mathematical function denoted $F_1$. This first function depends on the optical power P0 of the lens, assessed at the centre of the latter for the foveal vision, the ametropia correction determined for the wearer's peripheral vision and the angular offset considered, denoted PM, and the gain G calculated for the wearer. In other words: $PX=F_1(P0, PM, G)$.

Preferably, the function $F_1$ is such that a derivative of a first difference between the optical powers of the lens for the peripheral vision at the angular offset considered and for the foveal vision at the central point, with respect to a second difference between, on the one hand, the ametropia correction determined for the wearer's peripheral vision and the same angular offset, and, on the other hand, the optical power of the lens for the foveal vision at the central point, is itself an increasing function of the calculated gain (G). Namely:

$$\frac{d(PX-P0)}{d(PM-P0)}$$

is an increasing function of the gain G.

For example: $PX=a \cdot G^n \cdot (PM-P0)+P0+b$, where n is a strictly positive number, a and b are constant coefficients, a being positive.

Thus, the optical power of the lens in the peripheral zone is determined starting from the optical power in the central zone, by modifying the latter on the basis of the correction which is determined for the wearer's peripheral vision, with an amplitude which increases as a function of the value for the head/eye movement coordination gain.

Figure 2A:
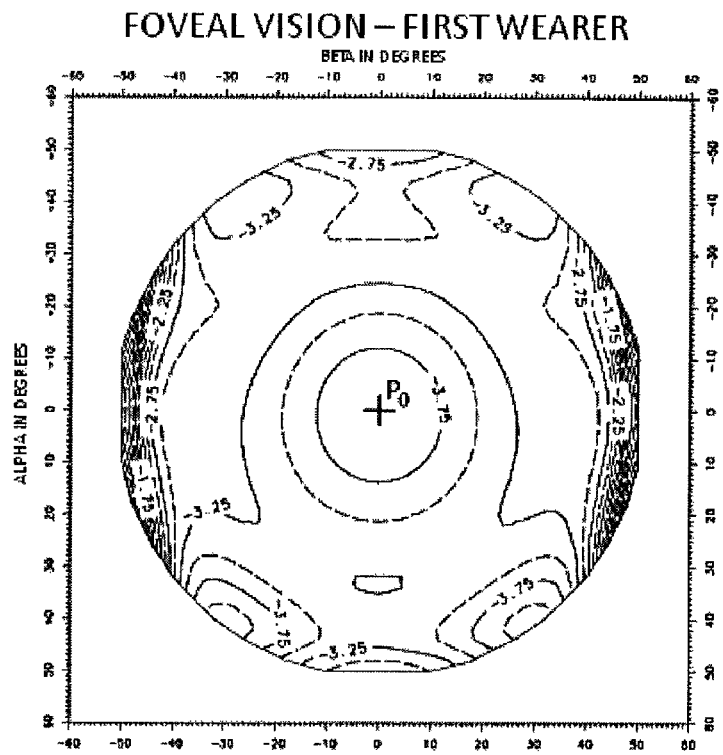
FIGS. 2a and 2b are characterizations of optical power of a first spectacles lens produced according to the invention, for a first wearer who moves the eyes more than the head.
Figure 2B:
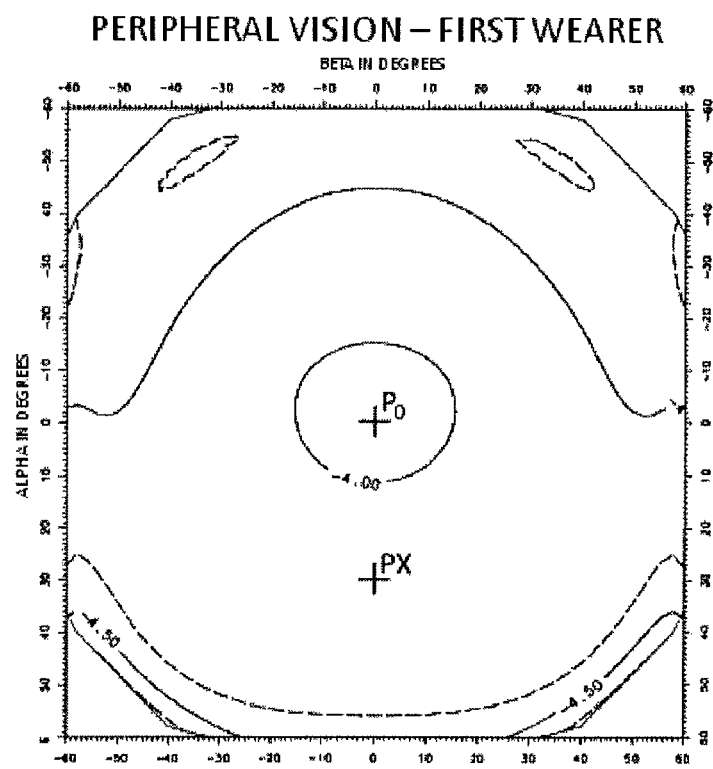

FIGS. 2a and 2b are maps of the optical power of a spectacles lens drawn for foveal vision and for peripheral vision, respectively. The x- and y-axes are respectively labelled with the values for the angular deviation of the gaze with respect to the optical axis of the lens, respectively in a horizontal plane and in a vertical plane, for the wearer's position of use of the lens. They are referenced in degrees and denoted ALPHA and BETA, ALPHA denoting the deviation in the vertical plane and BETA in the horizontal plane. Zero values for ALPHA and BETA correspond to the direction of gaze straight in front, passing through the centre of the lens. On these maps, the curves shown connect the points for which the optical power is constant. This value is indicated on some of the curves. A displacement in a map drawn for the foveal vision corresponds to a rotation of the eye behind the lens, while a displacement in a map drawn for the peripheral vision corresponds to a displacement in the image formed on the retina when the eye is immobile and looks through the centre of the lens.

The following values have been adopted by way of example for the formula for calculating the optical power PX described above: n=1.0; a=1.0 and b=−0.2 in order to obtain an under-correction in peripheral vision.

For the first wearer considered, there is obtained: PX=−4.12 diopters when PM=−3.2 diopters for an angular offset of 30°. The values for P0 and PX are found respectively at the centre of the map in FIG. 2a, and on the map in FIG. 2b for ALPHA equal to 30°.

Figure 3A:
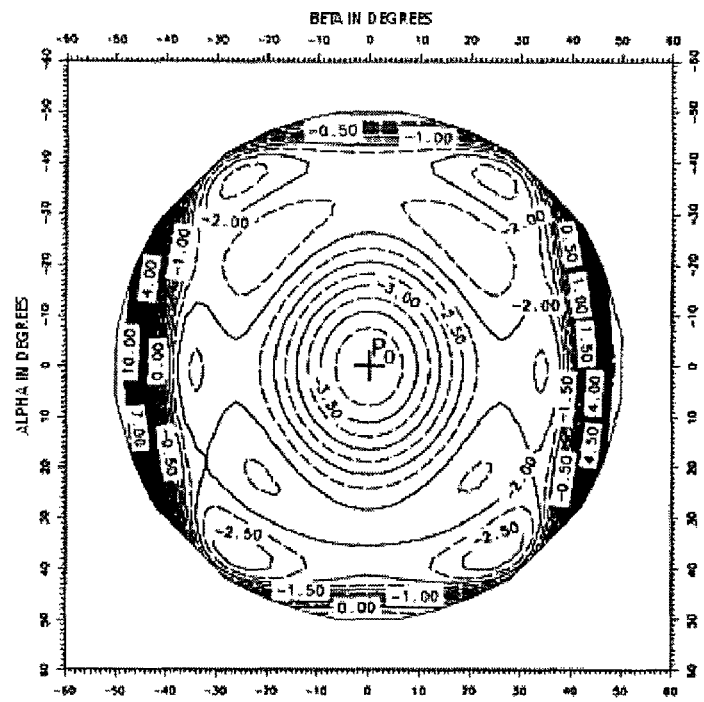
FIGS. 3a and 3b are characterizations of a second spectacles lens produced according to the invention, for a second wearer who moves the head more than the eyes.
Figure 3B:
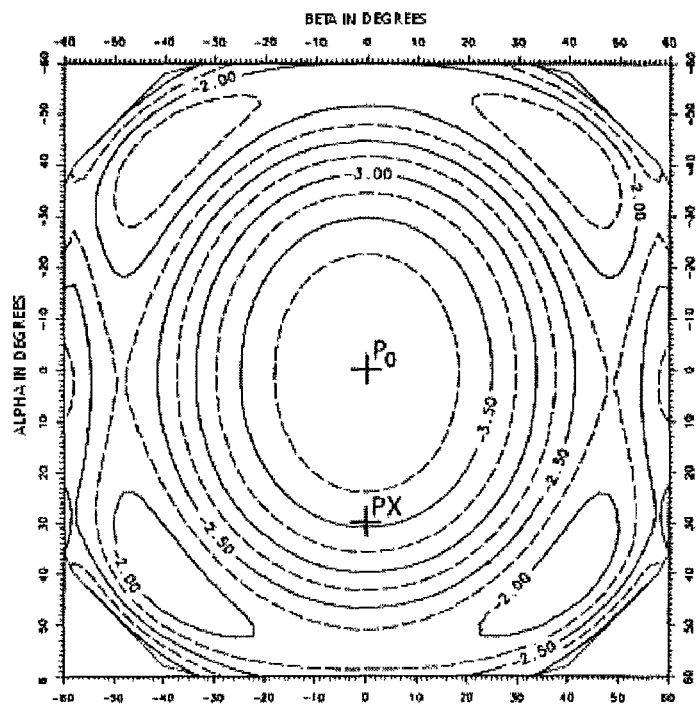

FIGS. 3a and 3b correspond respectively to FIGS. 2a and 2b for a second lens intended for the second wearer presented above. The same values as previously have been adopted for the parameters n, a and b. There is then obtained: PX=−3.56 diopters (FIG. 3b).

By comparing FIGS. 2a and 3a, it is apparent that the central zone of the lenses in which the foveal-vision optical power is approximately equal to −4.00 diopters is larger for the first wearer (FIG. 2a) than for the second wearer (FIG. 3a).

A second embodiment of the invention consists of determining the variation in the foveal-vision correction when moving radially over the lens starting from its optical centre. To this end, the optical power of the lens is determined for the foveal vision at a point of the surface of the lens located outside the central zone and which corresponds to a reference angular offset. This power, denoted PXC, may be determined using a second predefined mathematical function denoted $F_2$. This second function depends on the optical power P0 of the lens at the centre of the latter for the foveal vision, a reference value DP for an acceptable optical power defect for the foveal vision when the wearer's eye rotates through an angle corresponding to the reference angular offset, and the gain G. In other words: $PXC=F_2(P0, DP, G)$.

Preferably, the function $F_2$ is such that a derivative of a difference between the optical powers of the lens for the foveal vision, respectively for the reference angular offset and at the central point, with respect to the default power value DP, is itself an increasing function of the gain G. Namely:

$$\frac{d(PXC-P0)}{dDP}$$

is an increasing function of the gain G.

For example: $PXC=c \, G^m \, DP+P0+d$, where m is a strictly positive number, c and d are constant coefficients, c being positive.

In the other two examples of lenses referred to below, the number m is equal to 1.0 and the coefficients c and d are respectively equal to 3.0 and 0.0. The acceptable reference optical power defect DP is equal to 0.5 diopter and the reference angular offset remains equal to 30°.

Figure 4A:
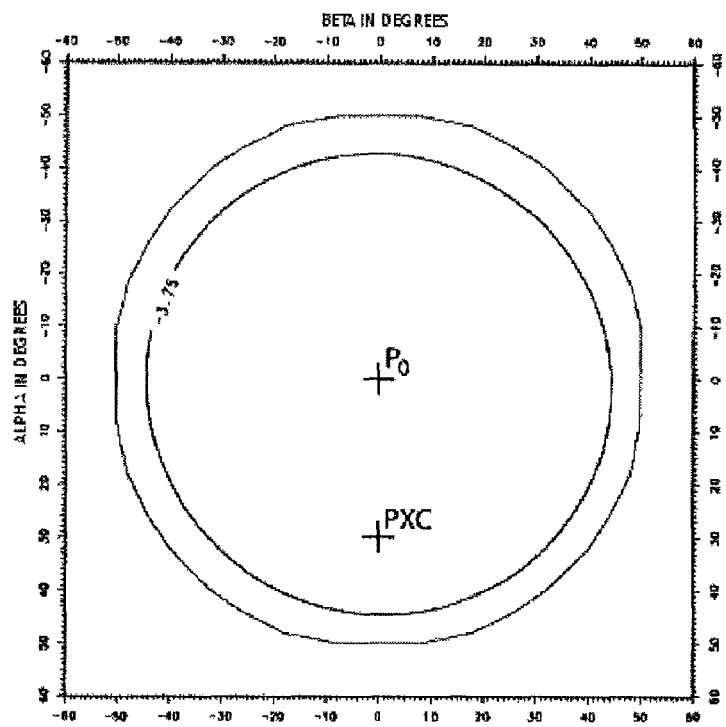
FIGS. 4a, 4b and 5a, 5b correspond respectively to FIGS. 2a, 2b and 3a, 3b for a variant embodiment of the invention.
Figure 4B:
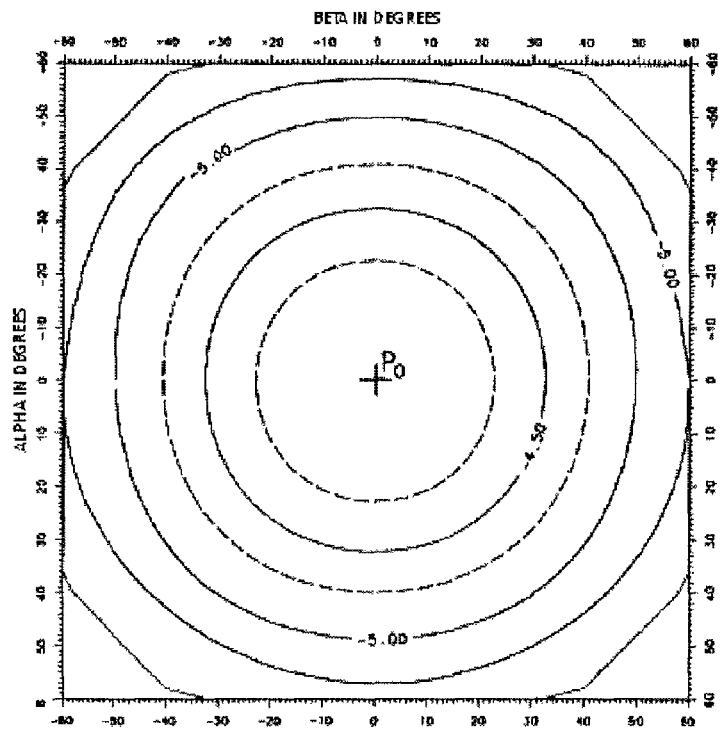

FIGS. 4a and 4b are maps of the optical power of a third lens which corresponds to this second embodiment of the invention, respectively for foveal and peripheral vision. This third lens is intended for the first wearer, for whom G is equal to 0.1. PXC is then equal to −3.85 diopters, for the above-mentioned numerical values. This value is apparent on FIG.

4a for the reference angular offset 30°. FIG. 4b shows that the peripheral vision is corrected in a different extent with respect to the foveal vision.

Figure 5A:
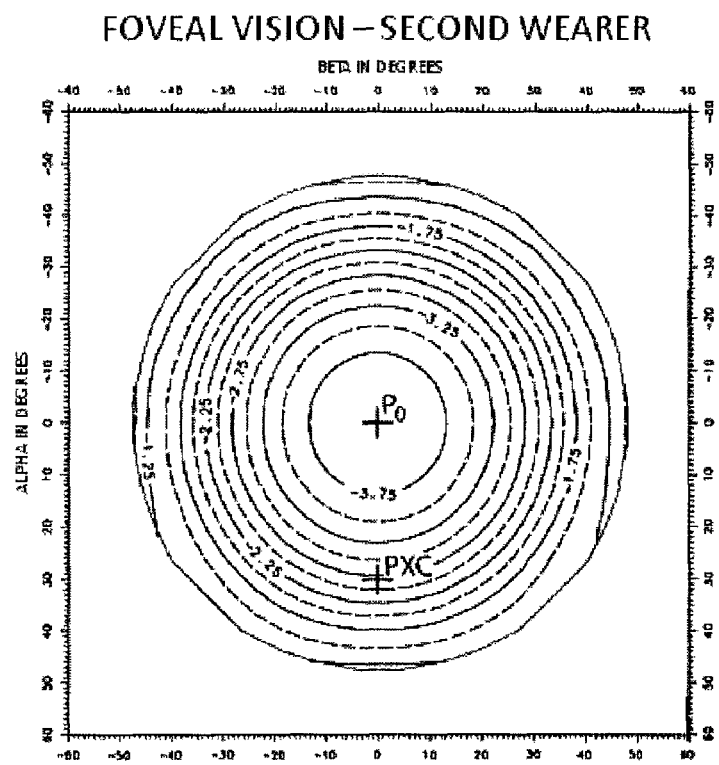
Figure 5B:
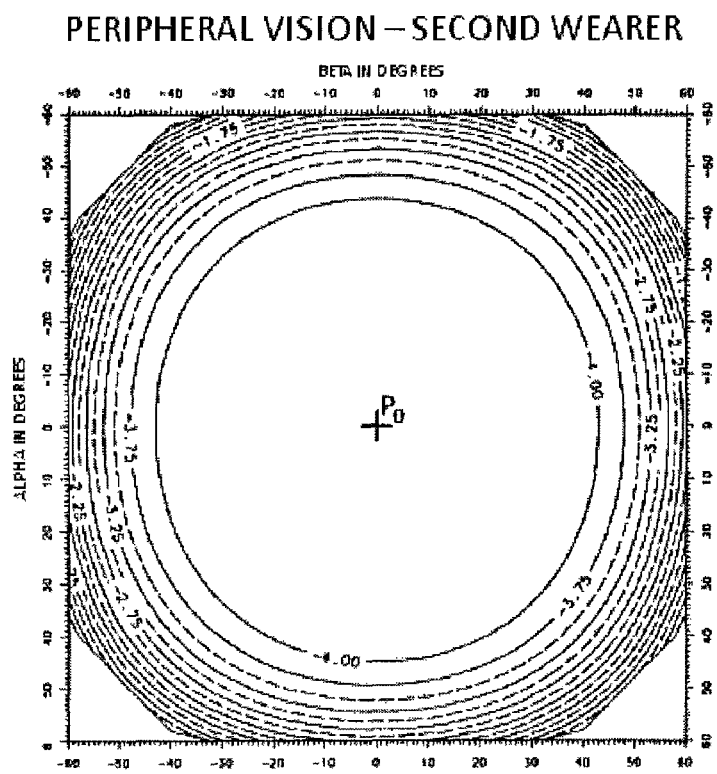

FIGS. 5a and 5b correspond to FIGS. 4a and 4b respectively, for a fourth lens also produced according to the second embodiment of the invention, but being intended for the second wearer, for whom G is equal to 0.8. For this second wearer, PXC is equal to −2.60 diopters (FIG. 5a). Comparison of FIGS. 4a and 5a shows that the central zone of the third lens intended for the first wearer is again larger than that of the fourth lens intended for the second wearer.

Each lens is then produced by varying at least one curvature of a face of the latter parallel to this face. To this end, two curvatures are determined at each point of a grid in the face starting from the corresponding optical power map, in a manner known per se. One of the second-operation machining methods for ophthalmic lenses that are also known to a person skilled in the art may then be used in order to provide the face of the lens with the determined variations of curvature. Alternatively, or in combination with a machining of the face of the lens, a refractive index of a lens material may be varied, also parallel to the face of the lens, in order to provide the lens with local optical-power characteristics which correspond to those determined for the central and peripheral zones.

Finally, it is understood that the invention may be reproduced in forms differing from those of the two embodiments that have been described in detail. A person skilled in the art will have understood from the present description that variations of the size of the central zone of the lens, in which the foveal vision is corrected, may be determined in various ways whilst retaining at least some of the advantages of the invention for the lens wearer.

The invention claimed is:

1. Method for the production of an ophthalmic element for correcting ametropia, capable of correcting the foveal vision and the peripheral vision of a wearer of said element, comprising the following steps:
/1/ characterizing a relative amplitudes of respective movements of the wearer's eyes and head;
/2/ determining ametropia corrections respectively for the foveal vision and the peripheral vision of the wearer;
/3/ determining an optical power distribution of the ophthalmic element along a face of said element, which produces the ametropia correction for the foveal vision in a central zone of the ophthalmic element, and which varies outside the central zone towards an optical power value corresponding to the ametropia correction for the peripheral vision; and
/4/ producing the ophthalmic element so as to obtain said optical power distribution,
wherein
step /3/ comprises determining the central zone of the ophthalmic element, which central zone produces the correction of the foveal vision, with a size for said central zone increasing as a function of the relative amplitude of the wearer's eye movements with respect to the wearer's head movements,
step /1/ comprises a gain calculation for a test of "head/eye" movement coordination carried out for the wearer, said gain being an increasing function of a quotient of an angular displacement of the wearer's head ($\alpha_T$) divided by an angular offset of a target viewed by said wearer, where the angular offset is equal to the sum of the angular displacement of the wearer's head and an angle of rotation of the wearer's eyes performed at the same time when viewing the target, and
the size of the central zone of the ophthalmic element in which the ametropia correction is produced for the wearer's foveal vision is determined in step /3/ via a value for the optical power of the ophthalmic element for a point located outside the central zone of said element, said optical power value at the point of the ophthalmic element located outside the central zone being itself determined as a function of the gain calculated for the wearer.

2. Method according to claim 1, wherein the ophthalmic element is adapted for producing a correction of a wearer's myopia.

3. Method according to claim 1, wherein the ophthalmic element comprises a spectacles lens.

4. Method according to claim 1, wherein the optical power of the ophthalmic element at the point of said element located outside the central zone and corresponding to a reference angular offset, is determined in step /3/ using a predefined first mathematical function of the optical power at a central point of the ophthalmic element for the foveal vision, the ametropia correction determined for the wearer's peripheral vision and said reference angular offset, and the gain calculated for the wearer.

5. Method according to claim 4, wherein said first mathematical function is such that a derivative of a first difference between the optical powers of the ophthalmic element for the peripheral vision at said reference angular offset and for the foveal vision at said central point, with respect to a second difference between, on the one hand, the ametropia correction determined for the wearer's peripheral vision and said reference angular offset, and, on the other hand, the optical power of the ophthalmic element for the foveal vision at the central point, is itself an increasing function of the calculated gain.

6. Method according to claim 1, wherein the optical power of the ophthalmic element for the foveal vision at the point of said element located outside the central zone and corresponding to a reference angular offset, is determined in step /3/ using a predefined second mathematical function of the optical power at a central point of the ophthalmic element for the foveal vision, a reference value for an optical power defect for the foveal vision when the wearer's eye rotates through an angle corresponding to said reference angular offset, and the gain calculated for the wearer.

7. Method according to claim 6, according to which said second mathematical function is such that a derivative of a first difference between the optical powers of the ophthalmic element for the foveal vision, respectively for said reference angular offset and at the central point, with respect to the power defect is itself an increasing function of the calculated gain.

8. Method according to claim 1, wherein the ametropia correction for the wearer's peripheral vision is determined in step /2/ by a measurement performed on said wearer.

9. Method according to claim 8, wherein the ametropia correction for the wearer's peripheral vision is determined by performing an autorefraction or skiascopy measurement on said wearer.

10. Method according to claim 1, wherein the ametropia correction for the wearer's peripheral vision and for a fixed angular offset is determined in step /2/ by adding a constant value to the ametropia correction value determined for the foveal vision of said wearer.

11. Method according to claim 10, wherein said constant value is +0.8 diopter for the angular offset of 30°.

12. Method according to claim 1, wherein the ophthalmic element is produced in step /4/ by varying at least one curvature of the face of said element or a refractive index of a material of said element, parallel to said face.

* * * * *